Figure 1:
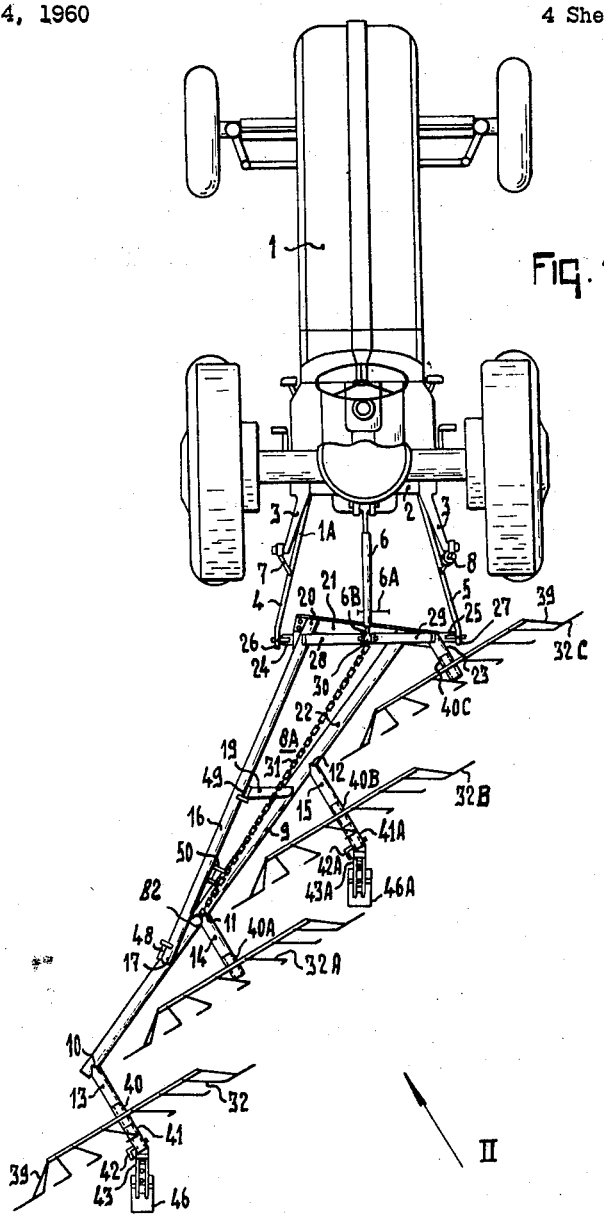

Oct. 29, 1963 C. VAN DER LELY ET AL 3,108,422
RAKING ATTACHMENT FOR SIDE DELIVERY RAKE
Filed April 14, 1960 4 Sheets-Sheet 1

INVENTORS
CORNELIS VAN DER LELY
ARY VAN DER LELY
BY

Oct. 29, 1963  C. VAN DER LELY ET AL  3,108,422
RAKING ATTACHMENT FOR SIDE DELIVERY RAKE
Filed April 14, 1960  4 Sheets-Sheet 2

INVENTORS
CORNELIS VAN DER LELY
ARY VAN DER LELY
BY

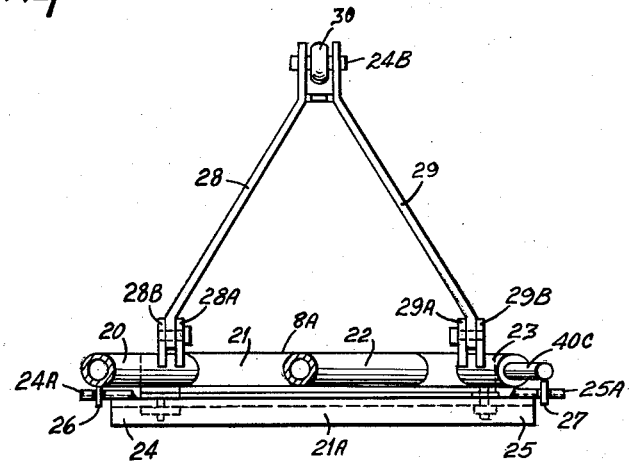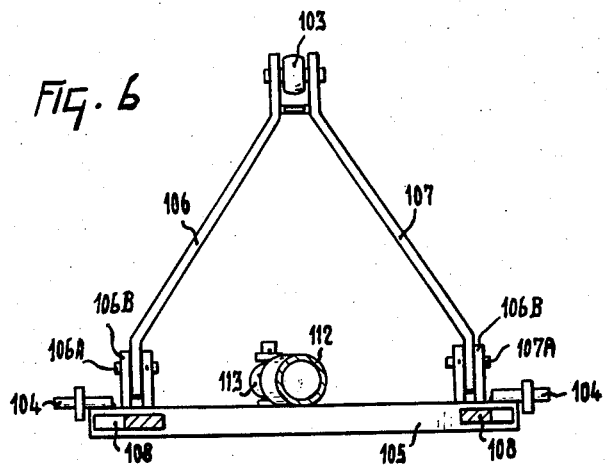

Oct. 29, 1963   C. VAN DER LELY ET AL   3,108,422
RAKING ATTACHMENT FOR SIDE DELIVERY RAKE
Filed April 14, 1960   4 Sheets-Sheet 4

INVENTORS
CORNELIS VAN DER LELY
ARY VAN DER LELY
BY

United States Patent Office 3,108,422
Patented Oct. 29, 1963

3,108,422
RAKING ATTACHMENT FOR SIDE
DELIVERY RAKE
Cornelis van der Lely, 7, Brüschrain, Zug, Switzerland, and Ary van der Lely, 10, Weverskade, Maasland, Netherlands
Filed Apr. 14, 1960, Ser. No. 22,242
6 Claims. (Cl. 56—377)

The invention relates to a raking attachment for a side delivery rake of the type having a row of rake wheels with circumferential tines which are freely and rotatably mounted on supports and which are rotated by contact of the tines with the ground or the crop during movement of the rake or both.

It has already been proposed to attach a side delivery rake to a tractor with the rake fixed to the power lift of the tractor so that it moves up and down with the links of the power lift.

It is an object of the invention to provide an improved attachment of the side delivery rake to the tractor so that the rake wheels and the eventually present groundwheels may readily follow the unevennesses of the ground.

The invention comprises in combination with a tractor having a power lift mechanism, a side delivery rake for laterally displacing material such as hay or other crops lying on the ground, comprising a frame, an echelon of parallel overlapping rake wheels mounted on said frame, a side delivery fastening device connected to one end of said frame for attachment to the power lift mechanism of said tractor, a horizontal or substantially horizontal pivot axis associated with said fastening device, said frame being swingably mounted to said fastening device about said substantially horizontal axis.

Another object of the invention relates to a side delivery rake for laterally displacing material such as hay or other crops lying on the ground comprising a frame, an echelon of parallel overlapping rake wheels mounted on said frame, a side delivery fastening device connected to one end of said frame for attachment to the power lift mechanism of a tractor, a substantially horizontal pivot axis associated with said fastening device, said frame being swingably mounted about a horizontal or substantially horizontal axis on said fastening device, said fastening device comprising an upstanding element, said upstanding element being provided with means for connection of the element to the uppermost link or links of the power lift mechanism, spring means, said spring means being connected to said frame to diminish the pressure of all of the rake wheels on the ground.

This is a continuation-in-part for a non-elected invention of our application Serial No. 549,482 with priority date of November 27, 1954, to issue as Patent No. 2,933,878, on April 26, 1960.

Figure 3:
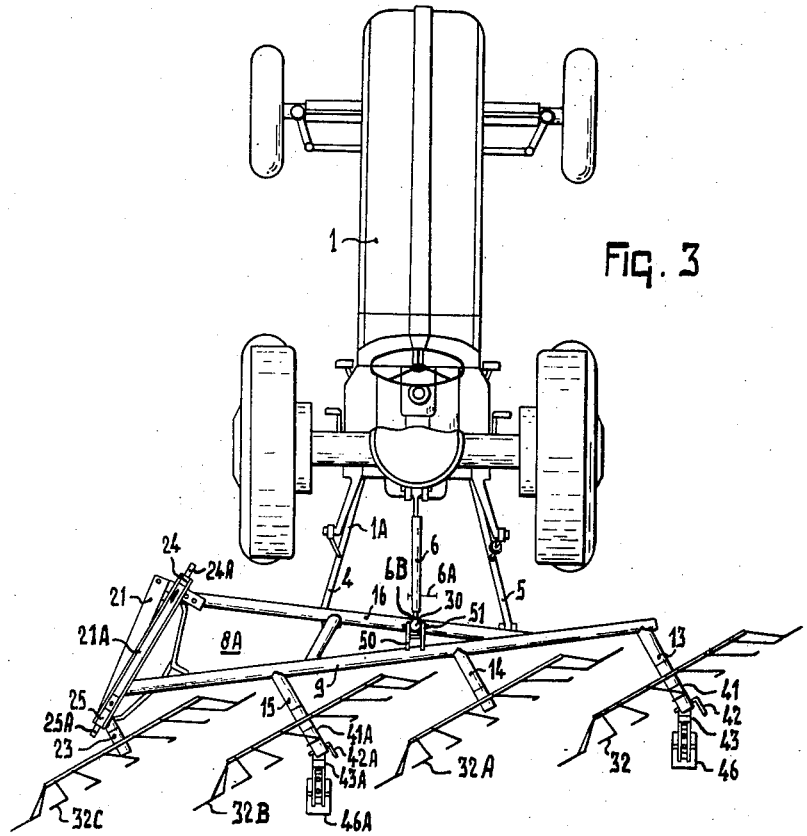
Figure 2:
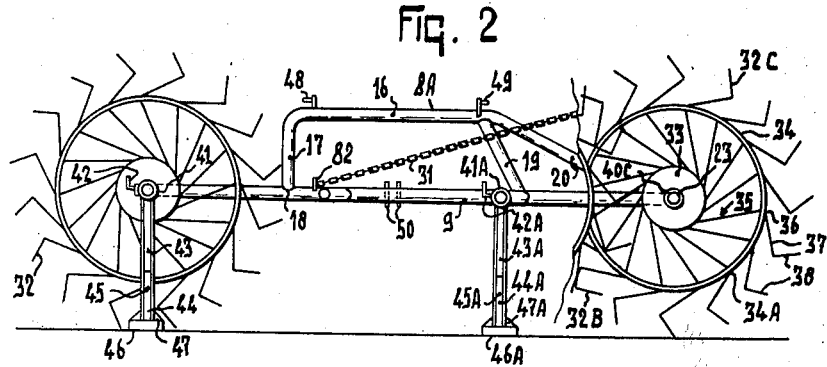
Figure 4:
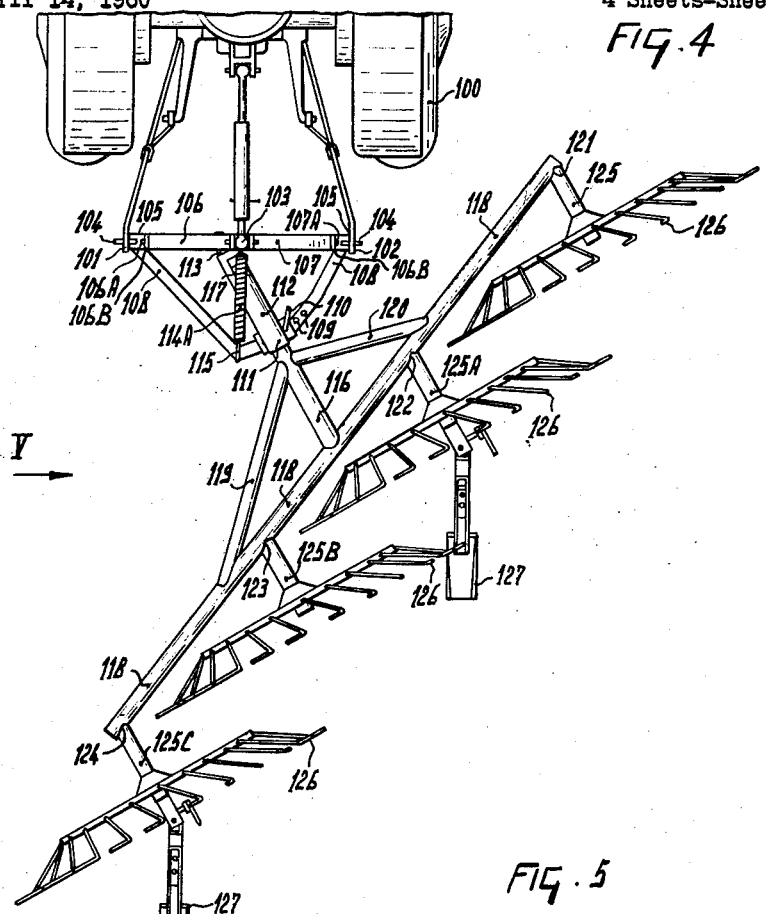
Figure 5:
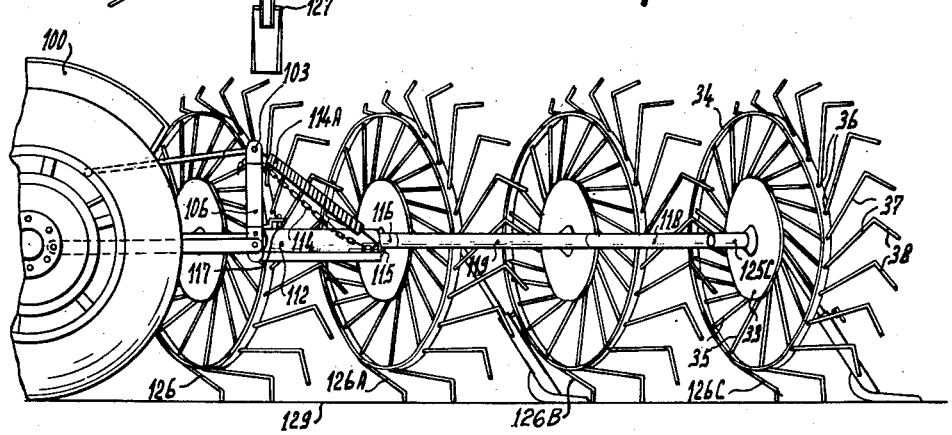

In order that the invention may be clearly understood and readily carried into effect, reference will now be made, by way of example, to the accompanying drawings, in which:

FIGURE 1 shows a plan view of a side delivery rake attached to a tractor,

FIGURE 2 shows a side elevation of the implement when viewed in the direction of the arrow II in FIGURE 1, part of the implement having been removed, FIGURE 3 shows a plan view of the implement shown in FIGURE 1 in such a working position that it serves as a tedder, FIGURE 3A shows on another scale a view of the side delivery fastening device by which the side delivery rake is attached to the tractor, FIGURE 4 shows in plan view a modified version of the implement shown in FIGURE 1 and attached to a tractor, FIGURE 5 shows a side elevation of that other modified version shown in FIGURE 4 when viewed in the direction of the arrow V, FIGURE 6 shows on another scale a view on the hitch structure by which the said delivery rake according to FIGURE 4 is attached to the tractor.

Referring to FIGURES 1, 2 and 3, a tractor 1 has a rear portion 2, which is provided with a three-point lifting device 1A comprising two arms 3 which can be raised and lowered by means of the tractor engine, and three vertically swingable links 4, 5 and 6. The latter are pivotally secured to the rear portion 2 of the tractor, the links 4 and 5 being substantially co-planar and being suspended from the free ends of the arms 3 by means of tie rods 7 and 8. The uppermost link 6, the length of which is adjustable by a telescopic connection with the bar 6B, is located between the links 4 and 5, but at a higher level. The length of link 6 can be secured by a pin 6A. The implement attached to the tractor 1 includes a frame 8A substantially consisting of a horizontal tube 9 on which horizontal and mutually parallel axles 13, 14 and 15 are mounted at 10, 11 and 12 respectively. A tube 16, one end 17 of which is bent vertically downwards, it attached to the tube 9 at 18. The tubes 9 and 16 are interconnected, at a distance from the place 18, by means of a short tube 19, while the other end 20 of the tube 16 is connected to the adjacent end 22 of the tube 9 by means of a horizontal bar 21.

The bar 21 carries an axle 23 which is parallel to, and co-planar with, the axles 13, 14 and 15. An axle 21A (see FIGURE 3), having ends 24 and 25, is adjustably connected to the bar 21 in such a way that the angle which the tube 9 makes, in a horizontal plane, with the longitudinal axis of the tractor 1, can be altered within certain limits. The ends 24 and 25 carry pins 24A, 25A which act as couplings for pivotal connection with the free ends 26 and 27 of the links 4 and 5, respectively, while an upstanding element consisting of two supporting bars 28 and 29, located in the same vertical plane and extending obliquely upwards from near the ends 24 and 25, respectively, are hinged at their upper ends to the link end 30 and at their lower ends by substantially horizontal pivot means, pins 28A and 29A, to lugs 28B and 29B respectively of the frame. Hence the upper ends of the bars 28 and 29 constitute a third coupling with the third link of the three-point lifting device. This third coupling lies at the upper point of a triangle, at the other vertices of which there are the couplings constituted by the aforesaid ends 24 and 25. A chain 31 extends from the link end 30 to a hook 82' attached, near 18, to the tube 9.

An echelon of four parallel overlapping rake wheels 32, 32A, 32B, 32C are rotatably mounted on the axles 13, 14, 15 and 23 respectively, and thus lie on the rearward side of the tubular beam 9. The structure of the rake wheels is exemplified by rake wheel 32C which consists of a hub 33 (see FIGURE 2), a rim 34, and steel wires 35, each of the latter being attached at one end to the hub 33 and passing through apertures at 36 in the rim 34. On the inner side of the rim 34 the steel wires 35 are located in the plane of the rim and at an angle to the radii of the rim. On the outer side of the rim, each steel wire is bent at 36 to form a support 37 for the tine 38. Each tine 38 is substantially parallel to that part of the steel wire 35 which is located on the inner side of the rim 34. When the tines 38 contact the ground and the rake wheel moves forwardly, each tine can deflect backwardly out of the plane in which it was contained prior to deflection. The associated wire 35 within the rim will torsionally resist the deflection. But the tine, whether deflected or not, will tend to occupy a position where it lies in a vertical plane and can perform an effective raking action. The supports 37 lie on a frustoconical surface 39 (see FIGURE 1). Hub 33 and the corresponding hubs for the rake wheels 32A, 32B and 32C are journaled on the axles 13, 14, 15 and 23 by means of bushings 40, 40A, 40B and 40C, respectively. The axles 13 and 15 extend through their respective bushings 40 and 40B and each carries a supporting device including a further bushing 41 and 41A. A hole is bored through each of the axles 13 and 15 and respective bushings 41 and 41A and intersects the axis of each bushing and axle, a locking pin 42 and 42A being entered in each hole. Each bushing 41 and 41A carry arms 43 and 43A having a slideable portion 44 and 44A which can be secured in a definite position by means of a locking bolt 45 and 45A and which carries at its lower end a shoe 46 and 46A having an upwardly bent front end 47 and 47A as shown in FIGURE 2. The ground supporting means, shoe 46, can easily slide forwardly over the ground, and forms, with the arm 43, the portion 44, the bolt 45 and the bushing 41, the supporting device.

The tube 16 of the frame 8A carries two aligned pins 48 and 49 which can be fixed to the link ends 26 and 27 of the three-point lifting device. In order to change the implement from the position where it serves as a side delivery rake (FIGURE 1), to the position where it serves as a tedder (FIGURE 3), the supporting bars 28 and 29 and the axle 21A having the ends 24 and 25 are released from the associated link ends 30, 26 and 27 respectively. The tube 9 carries a fork 50 which can be coupled, by means of a pin 51, to the link end 30, but only if, first of all, the implement is inverted, since the fork 50 is situated at a lower level than the pins 48 and 49. In the position where the implement serves as a tedder, the bushings 41 and 41A, the arms 43 and 43A with their corresponding shoes, 46 and 46A, are rotated, in a vertical plane and with respect to the frame, through 180° about the respective axles 13 and 15 with regard to the position which they occupied in FIGURES 1 and 2. In order to effect such rotation the pins 42 and 42A are drawn out of their respective holes, thus permitting the rotation to take place, after which the pins 42 and 42A can be re-introduced into the holes.

In the position shown in FIGURES 1 and 2 the implement is supported by the links 4 and 5 and by the shoes 46 and 46A, the frame 8A being movable about the axis of the pins carried by the ends 24 and 25. No force is exerted on the link 6 because the chain 31 is normally slack when the implement is in operation. Of course, the chain 31 can be easily shortened or lengthened by connecting various links of the chain to the hook 82.

During the operation of the implement the frame 8A can move up and down about a substantially horizontal axis afforded by the pins 24A and 25A on the ends 24 and 25, such axis lying transverse to the direction of travel. The frame 8A also swings during the up and down movement about the second horizontal axis afforded by the pins 28A and 29A so that the frame pivots with respect to the upstanding element constituted by the bars 28 and 29. Due to these two horizontal axes the implement may adjust itself in relation to the tractor for the accommodation of ground irregularities occurring in the direction of travel.

When the implement is raised by means of the lifting device, the chain 31 will be tensioned and will limit the angle between the frame and the supporting bars 28 and 29, causing the rake wheels 32, 32A, 32B and 32C and the shoes 46 and 46A to leave the ground so that the implement can be transported.

When the implement serves as a side delivery rake, material on the ground is delivered to the left (see FIGURE 1) during forward movement by means of the rake wheels which co-operate one with the other.

When the implement works as a tedder, each rake wheel 32, 32A, 32B and 32C separately clears the material from a narrow strip of ground. The worked strips may be very close together if the distances between the axles 13, 14, 15 and 23 of the rake wheels 32, 32A, 32B and 32C are chosen to give that result.

Referring to FIGURES 4 to 6, a tractor 100 carries a three-point lifting device having three link ends 101, 102 and 103. Pins 104 are pivoted in the link ends 101 and 102, the pins constituting the extremities of an axle 105. An upstanding element constituted by two supporting bars 106 and 107 extending obliquely upwards is hinged by pins 106A and 107A which comprise a substantially horizontal pivot axis to lugs 106B and 107B of the axle 105, the upper ends of the supporting bars 106 and 107 being hinged to the link end 103.

A horizontal bow 108 is attached to the axle 105, and is, in one part, formed with holes 109 to co-operate with a locking pin 110. An end 111 of a second pivot means, sleeve 112, is slideable along said part of the bow 108 and being provided at the same time with a hole for the pin 110, can be secured in various positions depending upon which one of the holes 109 registers with the hole in the end 111 to provide an entry for the pin 110, thus permitting the pin to secure the bow 108 and the sleeve 112 against relative angular movement. The other end 113 of the sleeve 112 is hingedly connected by a vertical pivot to the axle 105. Limiting means comprising a pressure regulating means to regulate the pressure of the rake on the ground comprising a chain 114 and a spring 114A connect the end link 103, by means of a hook 115, to the bow 108. A shaft 116 is rotatably supported in the sleeve 112, and can be secured in any one of several positions of angular adjustment therein, by means of a pin 117 which can be entered in a hole in the sleeve 112 and in one registering hole of several holes (not shown) in the shaft.

An end of the shaft 116 is connected to the center of a frame beam comprising tube 118 of the frame of the implement, the connection being reinforced by means of struts 119 and 120. Four axles 125, 125A, 125B and 125C parallel to the shaft 116 are attached to the tube 118 at 121, 122, 123 and 124 respectively, a rake wheel 126 being freely rotatable on each of the axles 125, 125A, 125B and 125C. Supporting devices, provided with shoes 127, similar to the supporting devices as described in connection with FIGURES 1 and 2 are mounted one on 125A and 125C. Each supporting device is positioned on that side of its associated rake wheel opposite the tractor 100. The rake wheels 126 are similar to the rake wheels described in connection with FIGURES 1 and 2. During operation of the implement the frame of the latter can move up and down due to the presence of the horizontal pivot axes constituted by the pins 104 and the pins 106A, 107A.

In that version of the implement which is shown in FIGURE 4, the frame can easily be inverted. It is only necessary to lift the frame a sufficient height from the ground 129 by means of the lifting device of the tractor, and subsequently to rotate the shaft 116, in the sleeve 112, through 180°. The shoes 127 are rotated through 180° relative to the frame in a manner as previously described in connection with FIGURES 1 to 3.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

As used in the claims: the term frame indicates tubes 9 and 16 and parts connecting same, and tube 118 and bow 108 and parts connecting same, the fastening device indicates the means connecting the frame to the power lift mechanism of the tractor as shown for example in FIGURES 3A and 6; and the pivot means are included in the latter constituting the particular means around which the frame pivots relative to the lift mechanism of the tractor, such as pins 24A and 25A, and pins 104 of axle 105.

We claim:

1. In combination with a tractor having a power lift mechanism, including a pair of transversely spaced vertically swingable links and including at least one link situated above said pair of transversely spaced links, a side delivery rake for laterally displacing material such as hay or other crops lying on the ground, comprising a frame, an echelon of parallel overlapping rake wheels mounted on said frame, a side delivery fastening device connected to said frame for attachment to the power lift mechanism of said tractor, a substantially horizontal pivot means associated with said fastening device, said frame being swingably mounted about said pivot means on said fastening device, said fastening device comprising an upstanding element, said upstanding element being provided with means for connection of the element to the uppermost link of the power lift mechanism.

2. A side delivery rake for laterally displacing material such as hay or other crops lying on the ground comprising a frame, an echelon of parallel overlapping rake wheels mounted on said frame, a side delivery fastening device connected to said frame for attachment to the power lift mechanism of said tractor, a substantially horizontal pivot means associated with said fastening device, said frame being swingably mounted about said pivot means with respect to said fastening device, said fastening device comprising an upstanding element, said upstanding element being provided with means for connection of the element to the uppermost link of the power lift mechanism.

3. A side delivery rake as set forth in claim 2, wherein said pivot means is located substantially perpendicular to the intended direction of movement of the device.

4. A side delivery rake for laterally displacing material such as hay or other crops lying on the ground comprising a frame comprising a frame beam, an echelon of parallel overlapping rake wheels, supports for said rake wheels, said supports being mounted on said frame beam in a fixed relation, a second frame beam, a substantially horizontal pivot means associated with said second frame beam, said first frame beam being swingably mounted about said pivot axle to said second frame beam.

5. A side delivery rake for laterally displacing material such as hay or other crops lying on the ground comprising a frame comprising a frame beam, an echelon of parallel overlapping rake wheels, supports for said rake wheels, said supports mounted on said frame beam in a fixed relation, a second frame beam, a substantially horizontal pivot means associated with said second frame beam, said first frame beam being swingably mounted about said pivot means to said second frame beam, said pivot means being substantially perpendicular to the intended direction of movement of the device.

6. A side delivery rake as claimed in claim 5, having a second pivot means wherein said first frame beam is freely pivotable about said second pivot means with respect to said first frame beam, said second pivot means extending parallel or substantially parallel to the supports of the rake wheels.

References Cited in the file of this patent

UNITED STATES PATENTS

| | | |
|---|---|---|
| 2,621,465 | Klemm | Dec. 16, 1952 |
| 2,811,009 | Plant | Oct. 29, 1957 |